July 8, 1952     L. S. WILLIAMS     2,602,657
SWIVEL DIAL
Filed Aug. 9, 1949     3 Sheets-Sheet 1
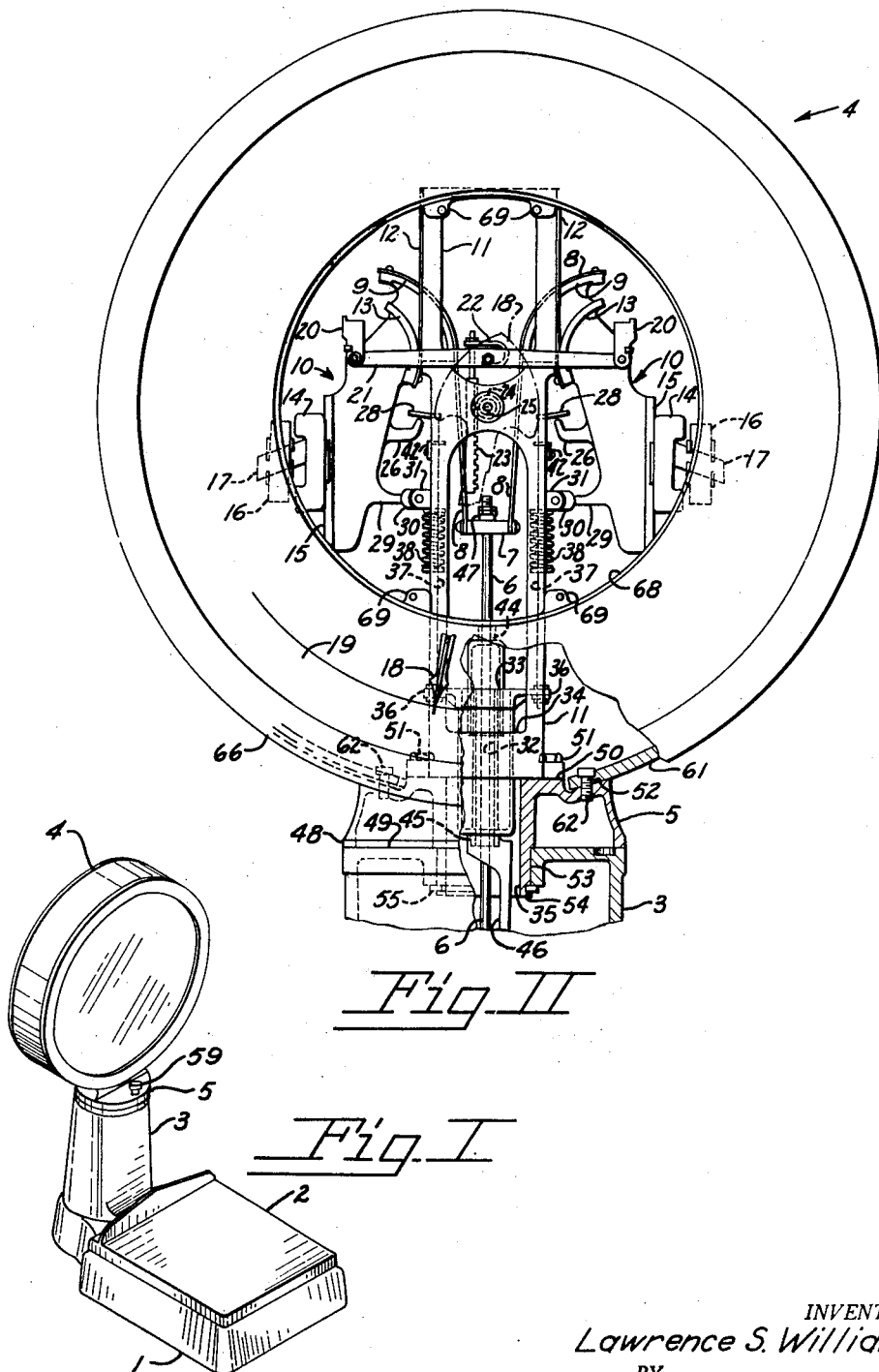
INVENTOR.
Lawrence S. Williams
BY
Marshall, Marshall & Leonard
ATTORNEYS

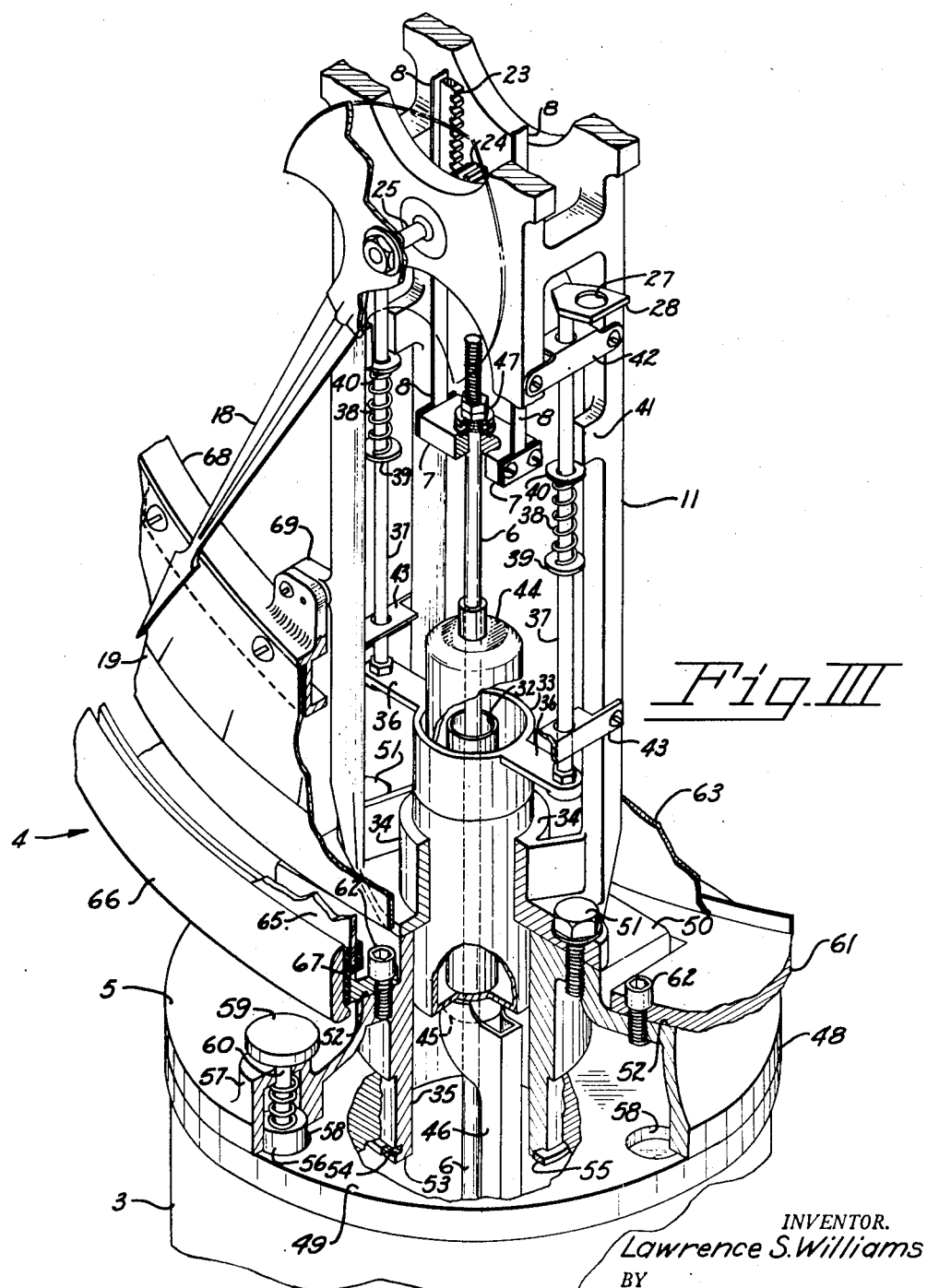

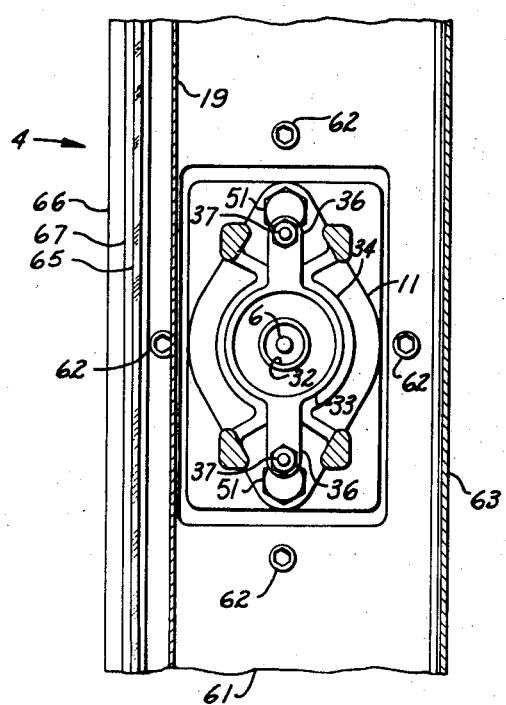
Fig. V
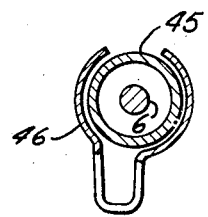
Fig. VI
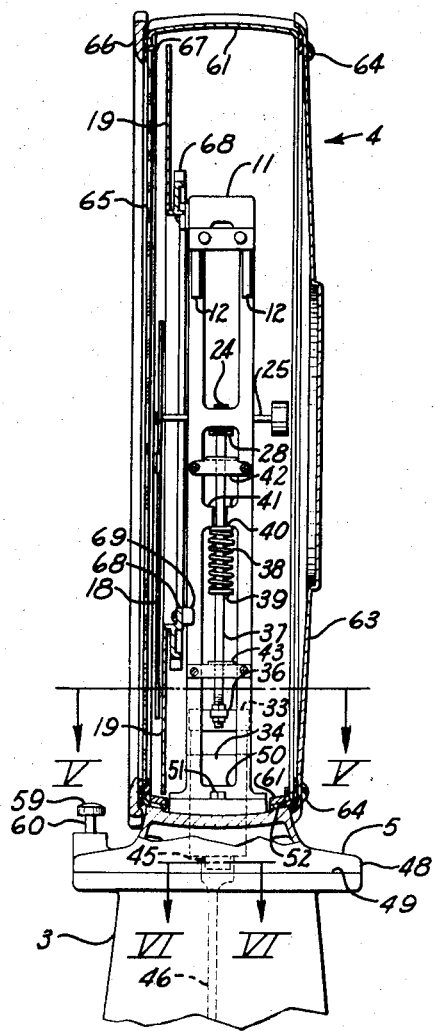
Fig. IV
INVENTOR.
Lawrence S. Williams
BY
Marshall, Marshall & Leonard
ATTORNEYS Patented July 8, 1952

2,602,657

UNITED STATES PATENT OFFICE 2,602,657

SWIVEL DIAL

Lawrence S. Williams, Toledo, Ohio, assignor to Toledo Scale Company, Toledo, Ohio, a corporation of New Jersey Application August 9, 1949, Serial No. 109,343

2 Claims. (Cl. 265—27)

This invention relates to weighing scales and in particular to an improved load counterbalancing and indicating mechanism frame and housing therefor which simplifies manufacture and provides greater accuracy in operation and greater convenience for the operator.

It has been customary to employ the dial housing of a scale as a support for the load counterbalancing mechanism and for the chart with which the indicator cooperates to indicate the magnitude of the load being counterbalanced. Such a construction is subject to several disadvantages. One of these is that the dial housing must be constructed in a manner such that relatively large portions of it may be removed to provide access to the weighing mechanism, and that the remaining portion must be sufficiently rigid and stable in dimension that it will not yield to externally applied forces and thus destroy the accurate cooperation between the chart and the load counterbalancing mechanism including the indicator.

Another limitation of the conventional method of constructing weighing scales, particularly of the portable variety, is that the dial housing enclosing the counterbalancing mechanism must be rigidly secured to the remainder of the scale frame in order that it may function within the required limits of accuracy. This rigid mounting limits the area within which an operator may be located and still be able to read the weight indications. Attempts have been made to overcome this difficulty by mounting the scale indicating mechanism for rotation about a vertical axis such that the scale dial may face any selected operator's position. These so-called "swivel" dials have not been entirely satisfactory because, as previously constructed, some other feature of construction had to be sacrificed to permit the rotation of the dial.

The principal object of this invention is to provide an improved supporting structure for a load counterbalancing mechanism and housing therefor in which the housing does not contribute to the support of any portion of the load counterbalancing or indicating mechanism.

Another object of the invention is to provide a weighing scale in which the framework that supports the load counterbalancing mechanism and indicating chart is mounted from the same base that supports the housing for the load counterbalancing mechanism but which framework is mounted independently of the housing.

A still further object is to provide a weighing scale in which the dial mechanism may be rotated about a vertical axis but which structure does not sacrifice any other features of construction.

More specific objects and advantages are apparent from the following description and drawings illustrating a weighing scale constructed according to the invention.

The improved structure constructed according to the invention comprises a generally circular base that surmounts a column of a weighing scale, a framework erected from the base and adapted to support load counterbalancing mechanism and an indicating chart that cooperates therewith, and a housing that encloses but does not touch any portion of the load counterbalancing mechanism or chart and which is secured to the generally circular base. As an additional feature, the housing of an oil seal that is employed to seal the entrance opening of a steelyard rod connected to the load counterbalancing mechanism is mounted for vertical movement in the base and lower portion of the frame supporting the load counterbalancing mechanism. The vertical motion of the oil seal housing may be employed to effect motion within the housing regardless of the rotational position of the housing.

A weighing scale embodying these improvements is illustrated in the accompanying drawings in which:

Figure I is a small perspective view of a portable scale constructed according to the invention.

Figure II is a front elevation, with parts broken away and other parts shown in section, of the dial housing and load counterbalancing mechanism of the improved scale.

Figure III is an enlarged fragmentary perspective view showing the lower portion of the frame for the load counterbalancing mechanism, a fragment of the housing, and the base that supports these elements from the column of the weighing scale.

Figure IV is a side elevation, partly in section, of the improved arrangement of load counterbalancing mechanism and dial housing.

Figure V is a fragmentary horizontal section taken substantially along the line V—V of Figure IV.

Figure VI is a fragmentary horizontal section through the bottom of the oil seal housing, as seen from the line VI—VI of Figure IV.

These specific figures and the accompanying description are intended merely to illustrate the invention but not to impose limitations on the claims.

Referring now to the accompanying drawings, Figure I illustrates a portable weighing scale having a base 1, a load receiving platter 2 supported above the base 1 by means of a lever system (not shown) enclosed within the base 1, and a column 3 erected from a portion of the base 1 at one end of the load receiver 2. A generally watchcase-shaped housing 4 is erected from a generally circular capital 5 that surmounts the column 3. The housing 4 and the capital 5 may be rotated on the column 3 to vary the orientation of the reading face of the scale with respect to the load receiver 2.

Referring to Figures II and III, forces from loads applied to the load receiver 2 and transmitted through the lever system contained within the base 1 are transmitted through a steelyard rod 6 that is suspended from a crosshead 7 which in turn is suspended from load ribbons 8, the upper ends of which overlie and are attached to load or power sectors 9 of load counterbalancing pendulums 10.

The pendulums 10 are suspended from a sector guide or frame 11, erected from the capital 5, by means of steel ribbons 12 the upper ends of which are attached to the upper portion of the frame 11 and the lower ends of which overlie and are attached to fulcrum sectors 13 of the pendulums 10. The power sectors 9 and fulcrum sectors 13 are of different diameters and, in effect, form sections of differential pulleys arranged so that the load forces applied through the ribbons 8 cause the pendulums 10 to roll upwardly along the sides of the frame 11. This upward rolling motion of the pendulums 10 is resisted by the force of gravity acting on pendulum weights 14 that are adjustably mounted on rails 15 of the pendulums 10. The geometry of the pendulums 10, which geometry includes the relative dimensions of the fulcrum sectors 13, power sectors 9, the offset of the center of the power sector 9 from the fulcrum sector 13, and the orientation of the rails 15 with respect to the line of centers of the sectors 9 and 13, is such that the pendulums 10 rotate through equal increments of angle for equal increments of load applied to the load receiver 2. The proportionality between the increments of angle and the increments of load may be adjusted by moving the weights 14 up or down along the rails 15 of the pendulums 10 while minor weights 16 mounted on inclined tracks 17 allow the half capacity indication of the scale to be corrected.

The upward rolling motion of the pendulums 10 following an increase in load applied to the load receiver 2 is used to actuate an indicator 18 that cooperates with a chart 19 to indicate the magnitude of the load being counterbalanced. The connecting mechanism between the pendulums 10 and the indicator 18 comprises yokes 20 pivotally mounted on the pendulum bodies 10 at the centers of the fulcrum sectors 13, compensating bars 21 supported from the yokes 20, a rack connection 22 pivotally mounted at the center of the compensating bars 21, and a rack 23 depending from the rack connection 22 and meshing with a pinion 24 that is mounted on an indicator shaft 25 which carries the indicator 18.

Each of the pendulums 10 includes a locking horn 26 the upwardly directed point of which, in the zero position of the pendulum 10, is located beneath a hole 27 (Figure III) in a locking bracket 28 that is slidably mounted in the frame 11.

Each of the pendulums 10 is also provided with a bumper bar 29 which, when the pendulum swings on decreasing load past its zero position, engages rubber stops 30 held in stop brackets 31 secured to the frame 11.

Referring now to Figure III, which shows the capital 5 and the adjacent portions of the housing 4 and the frame 11, the steelyard rod 6 is shown coming up through a central hole 32 in an annular oil seal cup 33 that is slidably mounted in a vertical boss 34 formed in the lower end of the sector guide or frame 11. The oil seal cup 33 extends downwardly into a vertical bore 35 extending through the capital 5. The upper end of the oil seal cup 33 is provided with laterally extending ears 36 to which ears rods 37 carrying the locking brackets 28 are attached. The rods 37 are continually urged downwardly by the force of helical compression springs 38 held compressed between washers 39 fixed to the rods 37 and other washers 40 engaged under inwardly directed lugs 41 of the frame 11. The rods 37 are guided in brackets 42 and 43 which thus serve to prevent rotation of the oil seal housing 33 with respect to the frame 11.

The oil seal cup 33 forms an annular receptacle for the reception of oil or other sealing liquid and an inverted cup 44 carried on the steelyard rod 6 dips into the oil and thus effectively prevents the ingress of dirt laden air or corrosive gas into the housing 4 along the steelyard rod 6.

The bottom of the oil seal cup 33 has a circular downwardly directed projection 45 that serves as a locating means for the upper end of a locking mechanism actuator 46 (see also Figure VI), the lower end of which is connected to a locking handle or other mechanism not shown in the drawings. In this embodiment the vertical movement of the oil seal cup is used to effect movement of the locking mechanism of the load counterbalancing mechanism. In general it serves as an element of a force transmission path for effecting an operation, other than the immediate counterbalancing of load, within the interior of a dial housing without affecting the transmission of force to the load counterbalancing mechanism contained within the housing and without disturbing the alignment or concentricity of the elements which allows free rotation of the dial housing 4 on the column 3.

To permit rotation of the housing 4 the steelyard rod 6, which is concentric with the axis of rotation of the housing 4 on the column 3, must be capable of rotation either with respect to the lever system of the scale or with respect to the crosshead 7 and load ribbons 8. In the mechanism shown in the drawings, the steelyard rod 6 is supported from a thrust bearing 47 seated on the crosshead 7 and is thus rotatable with respect to the crosshead 7.

The capital 5 is of unique construction in that it includes a generally circular downwardly directed wall 48 the lower surface of which conforms to the circular upper surface 49 of the column 3. The upper portion of the capital 5 has a flat shelf-like section 50 to which the lower end of the frame 11 is secured by a pair of bolts 51. Surrounding the shelf-like flat section 50 is a dished-in rim 52, the surface of which conforms to the surface of a sphere having its center located substantially at the center of the indicator drive pinion 24, i. e., the center of the housing 4.

Furthermore, the capital 5 has a depending cylindrical center section 53 that fits through a centrally located hole cut through the flat top of the column 3. The lower end of the cylindrical section 53 has a groove 54 for the reception of a lock ring 55 serving to retain the capital 5 in position on the top of the column 3.

The capital 5 is freely rotatable on the top of the column 3 and may be locked in any one of a number of positions by the engagement of a spring-urged bolt 56 which, being slidably mounted in a boss 57 of the capital 5, is engageable in any one of a series of blind holes 58 drilled in the upper surface of the column 3. The slidable bolt 56 is provided with a flat button 59 and stem 60 so that it may be readily withdrawn from the holes 58 to permit the capital 5 and associated structure to be freely rotated on the column.

The housing 4 includes an intermediate member 61 formed of sheet metal to a shape corresponding to the equatorial zone of a sphere, the center of which is located substantially at the center of the indicator pinion 24. A rectangular section is cut from this member to leave an opening large enough to receive the flat elevated portion 50 of the capital 5 so that the housing member 61 may be secured to the dished-in rim 52 of the capital 5 by four screws 62 located adjacent the sides of the raised flat section 50 and threaded into the capital 5. The edges of the intermediate member 61 are turned inwardly to form flanges against which a rear cover 63 may be secured as by means of screws 64.

The front of the dial housing 4 is closed by a glass cover 65 held in place by a ring 66 and formed rubber gasket 67. The ring 66 may be secured to the intermediate housing member 61 by means of screws in the same manner that the back cover 63 is held in place.

The screws 62 that hold the intermediate housing member 61 against the dished-in spherical surface 52 of the capital 5 are the only means for securing the housing 4. Thus any external force directed against the housing 4 is absorbed by the capital 5 and cannot distort any portion of the load counterbalancing mechanism or its support.

The chart 19, which carries the indicia with which the indicator 18 cooperates to indicate the magnitude of the load being counterbalanced, is supported on a ring 68 which in turn is secured to four lugs 69 projecting laterally from the frame 11. Since the chart 19 and the indicator 18 are carried in the same frame 11 and since there is no possibility of applying external force to the frame between the points of support of these members, it follows that their relative position and, consequently the indication of load, can not be affected by forces applied externally to the housing 4 of the scale. This offers the advantage that not only is the load counterbalancing mechanism protected from externally applied extraneous force but also that much more accurate positioning of cooperating elements may be accomplished during manufacture of the mechanism without any increase in cost or manufacturing complexity.

The improved structure thus provides a housed load counterbalancing and indicating mechanism that is sealed against the ingress of foreign material, that is rotatable for selectively varying the orientation of the reading face of the scale with respect to the load receiver, that is immune to forces applied to the housing, and that includes actuating means for performing mechanical motions within the housing without interfering with the rotation of the housing nor with the counterbalancing of load.

Various modifications may be made in the specific details of the device to adapt it to various uses. Such modifications may be made without losing the benefits secured by the invention and without departing from the spirit and scope of the claims.

Having described the invention, I claim:

1. In a load counterbalancing and indicating assembly for a weighing scale, in combination, a column, a capital that surmounts and is rotatable on said column, a frame erected from the capital, load counterbalancing and indicating mechanism carried on the frame, said frame and capital having bores substantially concentric with the axis of rotation of the base, a liquid seal comprising an upwardly opening annular cup axially slidable in the bore in the frame, and an inverted cup mounted on a member extending through the center of the annular cup that transmits force to the counterbalance, and means for axially sliding the annular cup whereby the annular cup serves as a force transmission path for effecting mechanical movements within the housing.

2. In a weighing scale, in combination, a hollow column having an upwardly directed generally annular surface, a capital having a flange resting on the annular surface and a downwardly directed cylindrical portion extending into the column, a housing erected from the capital, and a load counterbalancing and indicating mechanism supported from the capital independently of the housing, whereby said housing is freely rotatable without permitting force applied to the housing to affect the indication of load.

LAWRENCE S. WILLIAMS.

REFERENCES CITED

The following references are of record in the file of this patent:

UNITED STATES PATENTS

| Number | Name | Date |
| --- | --- | --- |
| 1,185,707 | Ohnell | June 6, 1916 |
| 1,606,938 | Hem | Nov. 16, 1926 |
| 1,614,682 | Osgood | Jan. 18, 1927 |
| 2,411,521 | Carliss | Nov. 26, 1946 |